United States Patent [19]

Sugimura et al.

[11] Patent Number: 4,871,591

[45] Date of Patent: Oct. 3, 1989

[54] FINISH COATING METHOD

[75] Inventors: You Sugimura, Odawara; Tadashi Watanabe, Hiratsuka; Yutaka Sugiyama, Ayase; Kazuhiko Ohira, Nagoya; Nobushige Numa, Ebina; Sachio Yamaguchi; Akira Kasari, both of Hiratsuka, all of Japan

[73] Assignee: Kansai Paint Company, Limited, Amagasaki, Japan

[21] Appl. No.: 148,538

[22] Filed: Jan. 26, 1988

[30] Foreign Application Priority Data

Jan. 27, 1987 [JP] Japan .................................. 62-16646
Jan. 29, 1987 [JP] Japan .................................. 62-19543
Feb. 3, 1987 [JP] Japan .................................. 62-22957

[51] Int. Cl.$^4$ .......................... B05D 3/02; B05D 1/36; B05D 7/00
[52] U.S. Cl. .............................. 427/388.5; 427/407.1; 427/409
[58] Field of Search ................... 427/407.1, 409, 388.5

[56] References Cited

U.S. PATENT DOCUMENTS 4,314,004 2/1982 Stoneberg ...................... 427/409 X

*Primary Examiner*—Michael Lusignan
*Attorney, Agent, or Firm*—Armstrong, Nikaido, Marmelstein, Kubovcik & Murray

[57] ABSTRACT

Disclosed is a finish coating method for forming a finish coat, comprising the steps of applying to a substrate a base coating composition containing a pigment and applying a clear top coating composition to the coated surface, the method being characterized in that the clear top coating composition is a curable one comprising predominantly a nonaqueous dispersion of a polymer of radically polymerizable monomer, the dispersion being prepared by polymerization of the radically polymerizable monomer in an organic solvent in which the monomer is soluble and in which the polymer produced from the monomer is insoluble and in the presence of a fluoroolefin polymer as a dispersion stabilizer which is soluble in the organic solvent and which has a weight-average molecular weight of about 5,000 to about 120,000 and a fluorine content of about 1 to about 60% by weight.

12 Claims, No Drawings

FINISH COATING METHOD

The present invention relates to a finish coating method for forming a finish coat comprised of a base coat containing a pigment and a clear top coat.

Finish coating methods for forming a finish coat comprised of a pigment-containing base coat and a clear top coat include methods for producing a metallic finish coat and methods for producing a solid color finish coat. Both types of methods can be carried out by a 2-coat 1-bake system or by a 2-coat 2-bake system.

Metallic coating methods by a 2-coat 1-bake system frequently employ a thermosetting base coating composition predominantly containing an acrylic resin, alkyd resin, urethane resin or the like, and a thermosetting clear top coating composition predominantly containing an acrylic resin, alkyd resin or the like. In such 2-coat 1-bake method, a clear top coating composition is applied before curing of the base coat with the result that the metallic pigment contained in the base coating composition tends to migrate into the clear top coat to be cured, leading to mottling in metallic texture. Consequently in order to prevent the mottling in metallic texture, a resin composition different in physical or chemical properties from a base coating composition has been generally used as a top coating composition.

However, the metallic coat formed from such coating compositions poses the problem that because the resin component in the clear top coat is deteriorated by ultraviolet light during a long-term outdoor exposure, the top coat suffers flaws such as impaired gloss, cracks, peels and the like. This metallic coat has further drawback of being prone to blistering because the resin compositions of different characteristics are used respectively as a base coating composition and a clear top coating composition.

Although disadvantageous in requiring an additional procedure, the 2-coat 2-bake metallic coating methods are advantageous in the following. Because the top coating composition is applied after curing of the base coat, the top coat formed is unlikely to have a mottle of metallic texture caused by the migration of the metallic pigment to the top coat. Accordingly resin compositions of similar characteristics may be used as a base coating composition and a top coating composition, whereby blistering between the coats can be prevented. Nevertheless, the 2-coat 2-bake methods remain to be improved in respect of the foregoing problem that a clear top coat tends to deteriorate due to ultraviolet light or the like during a long-term outdoor exposure. Thus the method is also required to form a top coat of good weatherability.

In the case of a solid color finish coat, the formation of a clear topcoat over a base coat, i.e. formation of two-layer solid color finish coat, serves to improve the weatherability, acid resistance, alkali resistance and other properties, and thus varied kinds of pigments have become usable as compared with a one-layer solid color finish coat. Nevertheless, further improvement in the weatherability of solid color finish coats is desired to prevent the flaws of solid color coats such as impaired gloss, cracks, blisters, decoloration, discoloration and the like.

To improve the weatherability of metallic finish coat and solid color finish coat from this viewpoint, attempts have been made to use as a clear top coating composition a dispersion-type coating composition of fluorine-containing resin comprising a polyfluorovinylidene resin powder dispersed in a solution of acrylic resin or a solution-type coating composition of fluorine-containing copolymer of fluoroolefin, vinyl ether and hydroxyl group-containing vinyl ether. The use of such coating compositions is intended to utilize the characteristics of fluorine-containing resin such as low intermolecular cohesion, outstanding chemical stability, good weatherability, high water repellency and oil repellency, excellent stain resistance, non-adherence and ability to form a coat of low refractive index. However, these coating compositions have the following drawbacks.

When the former dispersion-type coating composition of fluorine-containing resin is used as a clear top coating composition, the clear top coat formed therefrom is insufficient in transparency and is inferior to the coats produced from conventional top coating compositions in metallic effect, gloss, distinctness-of-image gloss and other properties. Further this dispersion-type coating composition is not able to achieve a sufficient degree of the effects peculiar to the fluorine-containing resins, and thus fails to exhibit a fully improved weatherability. On the other hand, when the latter solution-type coating composition of fluorine-containing copolymer is used as a clear top coating composition, a fluorine-containing monomer is used in an amount sufficient to cause the copolymer to display fully the foregoing characteristics of fluorine-containing resin, resulting in formation of a top coat impaired in the properties essentially required of coats such as thermal and mechanical properties including heat resistance, adhesion to a base coat, hardness, impact resistance and the like. Consequently it is difficult to produce from such coating composition a top coat having both the properties essentially required of coats and the characteristics imparted by the presence of the fluorine atom. Moreover, since fluorine-containing monomers are considerably expensive as compared with polymerizable vinyl monomers commonly used, it is important that the copolymer achieve the desired effect in a minimum content of fluorine-containing monomer.

It is an object of the present invention to provide a finish coating method for forming a finish coat comprised of two layers which is higher in weatherability and which is less likely to deteriorate over a prolonged period of time than the two-layer finish coat given by conventional finish coating methods.

It is another object to provide a finish coating method for forming a finish coat, the method, even if carried out by a 2-coat 1-bake system, being capable of producing a finish coat which is not apt to have flaws attributable to a long-term outdoor exposure such as impaired gloss, cracks, blisters, peeling, decoloration and discoloration.

It is a further object to provide a finish coating method for forming a finish coat using a clear top coating composition containing a small amount of fluorine-containing resin, the method being capable of producing a finish coat which has the excellent characteristics imparted by the presence of the fluorine atom such as good weatherability and which is high in thermal and mechanical properties.

It is a still further object of the invention to provide a finish coating method for forming a metallic finish coat, the method being capable of producing a metallic coat outstanding in finish appearance and unlikely to have flaws such as mottle of metallic texture, impaired gloss, cracks, blisters, decoloration, discoloration and the like, namely excellent in weatherability.

Other objects and features of the present invention will become apparent from the following description.

The present invention provides a finish coating method for forming a finish coat, comprising the steps of applying to a substrate a base coating composition containing a pigment (hereinafter referred to as "base coating") and applying a clear top coating composition to the coated surface, the method being characterized in that the clear top coating composition is a curable one comprising predominantly a nonaqueous dispersion of a polymer of radically polymerizable monomer, the dispersion being prepared by polymerization of the radically polymerizable monomer in an organic solvent in which the monomer is soluble and in which the polymer produced from the monomer is insoluble and in the presence of a fluoroolefin polymer as a dispersion stabilizer which is soluble in the organic solvent and which has a weight-average molecular weight of about 5,000 to about 120,000 and a fluorine content of about 1 to about 60% by weight.

The present invention has the feature that a curable coating composition is used as a clear top coating composition (hereinafter referred to as "top coating") in a finish coating method for forming a two-layer finish coat comprised of a pigment-containing base coat and a top coat, said curable coating composition comprising predominantly a nonaqueous dispersion of a polymer of radically polymerizable monomer, said dispersion containing as a dispersion stabilizer a specific fluoroolefin polymer. The dispersion is hereinafter referred to as "F-NAD".

The coating method of the present invention is capable of producing a finish coat having a clear top coat which has both the properties essentially required of coats and the characteristics imparted by the presence of the fluorine atom, namely a top coat which is excellent in the properties peculiar to fluorine-containing resins such as chemical stability, weatherability, water repellency, oil repellency, stain resistance, non-adherence and low refractive index and which is satisfactory in thermal, chemical and mechanical characteristics essentially required of coats such as heat resistance, alkali resistance, adhesion to a base coat, hardness, gloss, distinctness-of-image gloss, impact resistance and the like. Further the coating method of this invention provides a finish coat whose tendency to deteriorate by a long-term outdoor exposure is extremely reduced.

The top coat formed by the method of the present invention has the above-mentioned excellent properties because the continuous phase of coat formed from F-NAD used in the invention is composed chiefly of the dispersion stabilizer (i.e. fluoroolefin polymer). Thus the surface layer of the top coat mainly exhibits the properties imparted by the presence of the fluorine atom, such as excellent weatherability, water repellency, oil repellency and stain resistance, non-adherence and low refractive index. Moreover, the polymer particles of the dispersion serve to enhance the thermal, chemical and mechanical properties required of coats. In other words, the strength of coat can be improved by the reinforcing ability of the polymer particles and stress built up with time within the coat can be absorbed at the interface between the polymer particles and the dispersion stabilizer with the result that stress can be prevented from increasing, thereby eliminating a possibility of the stress developing to great energy sufficient to cause cracking and other damages throughout the coat. Furthermore, since the fluorine atom has only to be present in the continuous phase (dispersion stabilizer) and need not be contained in the interior of polymer particles in the dispersion, the dispersion can exhibit the characteristics imparted by the fluorine atom which are comparable to those attainable by the conventional solution of fluorine-containing copolymer prepared by solution polymerization method even if a smaller amount of fluorine-containing monomer is used in preparation of the dispersion than in preparation of conventional solution. Accordingly the top coating of the invention has a further advantage of enabling the formation of coats favorable in terms of costs.

The top coat formed on the pigment-containing base coat from the clear top coating by the method of the invention is free of flaws such as impaired gloss, cracks, peeling and blisters caused by a long-term exposure and thus is significantly improved in weatherability. Furthermore, the top coat thus formed can sustain the water repellency on its surface for a long period of time so that water is prevented from permeating through the coats and from gathering in between the coats among the primer, intercoat, base coat and top coat (i.e. blister). The use of F-NAD, even if in a 2-coat 1-bake method, provides a coat with a finish appearance having markedly improved gloss, distinctness-of-image gloss and like properties which, moreover, are retained for a prolonged period of time. Further the use thereof can substantially completely prevent the peeling, blistering and the like between the base coat and the top coat.

The finish coating method of the present invention will be described below in more detail.

<Base coating>

The base coating is applied before application of the clear top coating. The base coating useful in the present invention includes a wide range of conventional coating compositions comprising a curable resin composition and a pigment as main components and may be any of metallic coating composition and solid color coating composition. The term "metallic coating composition" used herein refers to a coating composition predominantly containing a curable resin composition and a metallic pigment. And the term "solid color coating composition" used herein denotes a coating composition predominantly containing a curable resin composition and a color pigment and capable of producing a colored coat.

The base coating useful in the present invention may be any of those prepared using an organic solvent such as organic solvent solution-type or nonaqueous dispersion-type coating compositions and those of the aqueous type such as aqueous solution-type or aqueous dispersion-type coating compositions.

The above-mentioned curable resin composition is three-dimensionally cross-linked to cure. Useful curable resin compositions are thermosetting resin compositions comprising a cross-linking agent and a base resin such as acrylic resin, polyester resin, epoxy resin, urethane resin, alkyd resin or the like. Preferred examples of useful base resins are acrylic resin, polyester resin and the like. These base resins are usable singly or at least two of them can be used in mixture. A cross-linking agent suitably selected depending on the kind of base resin used is usable. Examples thereof are amino resin, blocked polyisocyanate compound, etc. Moreover, also usable as the resin compositions are those which comprise a base resin and a cross-linking agent such as a polyisocyanate compound or the like and which are cross-linkable by standing at room temperature or by heating to a low temperature of about 140° C. or lower.

Such resin compositions may contain a resin which is not cross-linkable, such as cellulose acetate butyrate resin or the like.

Examples of metallic pigments to be contained in the metallic coating composition are aluminum powder, copper powder, mica powder, micaceous powder consisting of mica particles coated with titanium oxide or iron oxide, MIO (micaceous iron oxide) and the like. Examples of color pigments to be contained in the solid color coating composition include a wide range of color pigments ranging from organic or inorganic pigments of relatively low hiding power imparting a color such as blue, red, green or yellow to inorganic pigments of high hiding power imparting a color such as white, black or red. Examples of the pigments are phthalocyanine blue, azo-type red pigments, titanium oxide, carbon black, red iron oxide and the like.

These pigments are usable singly or at least two of them can be used in mixture. The metallic pigment can be used in mixture with color pigments. The amount of the pigment can be suitably determined depending on the kind of the pigment used. A preferred amount of the pigment is about 1 to about 100 parts by weight per 100 parts by weight of the resin composition (calculated as solids).

Of base coatings useful in the present invention, the organic solvent solution-type coating compositions can be prepared by dissolving the above-mentioned resin composition in an organic solvent useful for coating compositions and dispersing the pigment in the organic solvent. Useful organic solvents include those which can be used for conventional pigment-containing coating compositions, such as toluol, xylol, petroleum solvents and like hydrocarbon solvents, ethyl acetate, butyl acetate, ethylene glycol monoethyl ether acetate and like ester solvents, methyl ethyl ketone, methyl isobutyl ketone and like ketone solvents, ethylene glycol monoethyl ether, diethylene glycol monobutyl ether and like ether solvents, methanol, butanol and like alcohol solvents, etc.

The nonaqueous dispersion-type coating compositions are those having dispersed the particles of coating resin and a pigment in a solution of dispersion stabilizer in an organic solvent. The nonaqueous dispersion-type coating composition is prepared by known methods, for example, by polymerizing a radically polymerizable monomer in a solution of a dispersion stabilizer in an organic solvent. Preferred examples of useful organic solvents are hexane, heptane, octane, mineral spirit and like aliphatic hydrocarbon solvents. Also included among useful solvents are cellosolve acetate, cellosolve carbitol, butyl acetate, toluol, xylol and like esters, ethers and aromatic hydrocarbon solvents. Useful dispersion stabilizers are amphipathic resins which have two portions one of which is soluble in these organic solvents and and the other of which is compatible with the dispersed polymer. Specific examples thereof are polyester resins, acrylic resins, natural rubber, cellulose, graft copolymers of such stabilizers with vinyl monomers, etc. Radically polymerizable monomers to be polymerized in a solution of dispersion stabilizer in an organic solvent include those exemplified below as useful in preparation of F-NAD.

The aqueous solution-type coating compositions are prepared by dissolving in deionized water a resin composition containing a water-soluble base resin and dispersing a pigment therein.

The aqueous dispersion-type coating compositions are those having the particles of coating resin dispersed in deionized water. Such coating compositions are prepared from a resin composition containing a water-dispersible base resin by known methods.

It is preferable that the base coatings as described above have a solids concentration of about 20 to about 70% by weight.

Of the above-mentioned base coatings, the nonaqueous dispersion-type coating compositions are preferably used because the mechanical strength of coats and the interlayer adhesion can be improved by the particles of polymer contained in the coating composition so that cracking, blistering, peeling and mottle of metallic texture can be more effectively prevented.

<Clear top coating>

The clear top coating is applied to the base coat and is a curable coating composition which is capable of forming a transparent coat and which predominantly contains F-NAD.

The fluoroolefin polymer to be used as a dispersion stabilizer contains fluoroolefin as a constituent and has weight-average molecular weight of about 5,000 to about 120,000 (number-average molecular weight of about 1,000 to about 60,000) and a fluorine content of about 1 to about 60% by weight. The polymer is soluble in an organic solvent at room temperature and is a homopolymer of fluoroolefin or a fluoroolefin copolymer containing as a copolymerizing component at least one unsaturated monomer (hereinafter referred to as "unsaturated monomer (A)") selected from the group consisting of vinyl ether compounds such as alkyl vinyl ether, alicyclic vinyl ether, hydroxy vinyl ether and glycidyl group-containing vinyl ether, and olefin compounds such as olefin and haloolefin. The amount of the unsaturated monomer (A) is in such range that the fluorine content in the copolymer is about 1 to about 60% by weight.

Examples of the fluoroolefin are fluoroolefin having 1 to 6 fluorine atoms and 2 to 3 carbon atoms such as tetrafluoroethylene, chlorotrifluoroethylene, vinyl fluoride and vinylidene fluoride. Carboxyl group-containing fluoroolefin can be also used as such fluoroolefin.

Examples of the alkyl vinyl ether to be used as the other copolymerizing component are ethyl vinyl ether, isobutyl vinyl ether, n-butyl vinyl ether and the like. Examples of the alicyclic vinyl ether are cyclohexyl vinyl ether, derivatives thereof and the like. Examples of the hydroxy vinyl ether are hydroxybutyl vinyl ether and the like. Examples of the glycidyl-containing vinyl ether include the above vinyl ethers with glycidyl group attached thereto. Examples of the olefin and haloolefin are ethylene, propylene, isobutylene, vinyl chloride, vinylidene chloride and the like.

These unsaturated monomers (A) are usable singly or at least two of them can be used in mixture. When required, the unsaturated monomers (A) may be replaced partly by other unsaturated monomers (hereinafter referred to as "unsaturated monomer (B)") such as unsaturated carboxylic acid, ester of unsaturated carboxylic acid, vinyl carboxylate, vinyl aromatic compounds, acrylonitrile, methacrylonitrile or the like. Such unsaturated monomer(B) can be used in an amount of up to about 20% by weight, preferably up to about 10% by weight, based on the combined amount of the unsaturated monomers (A) and (B).

Examples of the unsaturated carboxylic acid are acrylic acid, methacrylic acid, crotonic acid, maleic acid, maleic anhydride, etc. Examples of the ester of unsaturated carboxylic acid are $C_1$–$C_{18}$ alkyl acrylate or methacrylate such as methyl acrylate, ethyl acrylate, propyl acrylate, isopropyl acrylate, butyl acrylate, hexyl acrylate, octyl acrylate, lauryl acrylate, methyl methacrylate, ethyl methacrylate, propyl methacrylate, isopropyl methacrylate, butyl methacrylate, hexyl methacrylate, octyl methacrylate, lauryl methacrylate and the like; $C_2$–$C_8$ hydroxyalkyl acrylate or methacrylate such as hydroxyethyl acrylate or methacrylate, hydroxypropyl acrylate or methacrylate and the like; N,N-dimethylaminoethyl acrylate or methacrylate, N,N-diethylaminoethyl acrylate or methacrylate; etc. Examples of the vinyl carboxylate are vinyl acetate, n-vinyl butyrate, etc. Examples of the vinyl aromatic compound are styrene, α-methyl styrene, vinyl toluene, etc.

The fluoroolefin polymer has a fluorine content of about 1 to about 60% by weight, preferably about 10 to about 40% by weight.

The polymer with a fluorine content of less than about 1% by weight can not fully exhibit the characterisitics of fluorine-containing polymer, whereas the polymer with a fluorine content of more than about 60% by weight has a reduced solubility in an organic solvent.

A polymerizable double bond may be introduced into such fluoroolefin polymer. The double bond can be introduced, for example, by using a carboxyl group-containing monomer as the copolymerizing component in the fluoroolefin copolymer and reacting the carboxyl group with a glycidyl acrylate or methacrylate, allyl glycidy ether or like glycidyl group-containing unsaturated monomer. The introduction of the double bond can be also performed by reacting a glycidyl group-containing fluoroolefin copolymer with a carboxyl group-containing unsaturated monomer.

Other combinations are possible, such as those of acid anhydride group with hydroxyl group, those of acid anhydride group with mercaptan group, those of isocyanate group with hydroxyl group, etc. General conditions for the addition reaction between such combinations of reacting groups are well known. Also it is known that the reaction temperature is variable depending on the combination of reacting groups to be selected and the presence of a catalyst.

The double bond thus introduced produces a covalent bond between the dispersion stabilizer and the polymer forming the particles, thereby achieving more improvements in the storage stability and mechanical stability of the dispersion. According to this invention, the resin as the dispersion stabilizer need not invariably be provided with polymerizable double bond. It is preferred that 0.1 to 2 moles of polymerizable double bonds on the average be present per mole of the dispersion stabilizer resin.

Examples of the fluoroolefin polymer are those soluble in organic solvents, such as the "LUMIFLON" series manufactured by Asahi Glass Company Limited, Japan (e.g. "LUMIFLON LF 200" with weight-average molecular weight of 50,000, "LUMIFLON LF 400," "LUMIFLON LF4006"), "Cefral Coat" (trade mark, product of Central Glass Co., Ltd., Japan), "Kynar SL", "Kynar ADS" (trade marks, products of Pennwalt Corp., U.S.A.), etc.

It is suitable that the polymer have a weight-average molecular weight of about 5,000 to about 120,000 (number-average molecular weight of about 1,000 to about 60,000), preferably about 10,000 to about 60,000. The polymer with a molecular weight of less than about 5,000 is prone to result in insufficient stability of polymer particles in the dispersion and to induce agglomeration and sedimentation, whereas the polymer with a molecular weight of greater than about 120,000 tends to have a reduced solubility in the organic solvent and to significantly increase the viscosity of the dispersion.

The polymerization for producing the fluoroolefin polymer is carried out using a radical polymerization initiator. Usable radical polymerization initiators include, for example, azo initiators such as 2,2′-azobisisobutyronitrile, 2,2′-azobis(2,4-dimethylvaleronitrile) and the like, and peroxide initiators such as benzoyl peroxide, lauryl peroxide, tert-butyl peroctoate and the like. The polymerization initiator is used in an amount of about 0.2 to about 10 parts by weight, preferably about 0.5 to about 5 parts by weight, per 100 parts by weight of the monomer(s) to be polymerized. The reaction is usually conducted by emulsion polymerization in an aqueous medium or a solution polymerization in an organic solvent. Usable as organic solvents are a variety of solvents such as aromatic hydrocarbons, alcohols, esters, ketones, glycol ethers, commercially available thinners, etc. These solvents are usable singly or at least two of them can be used as mixed in varying proportions. The reaction temperature and reaction pressure can be suitably determined depending on the kind of the polymerization initiator to be used, kind of the solvent to be used and the reaction mode involved.

According to the present invention, F-NAD is prepared by polymerizing at least one radically polymerizable monomer in an organic solvent in the presence of the fluoroolefin polymer as a dispersion stabilizer.

The above-mentioned fluoroolefin polymers are usable singly or at least two of them different from each other in the composition or molecular weight may be used in mixture. When required, the other type of dispersion stabilizer can be mixed with the fluoroolefin polymer. Examples of useful such stabilizers are alkyl etherified melamine formaldehyde resin, alkyd resin, acrylic resin or the like. The amount of the stabilizer is less than about 60% by weight based on the total amount of the dispersion stabilizers.

The organic solvents used in the polymerization include those which do not dissolve the polymer particles produced by the polymerization but which dissolves the dispersion stabilizer and the radically polymerizable monomer.

Examples of such organic solvents are aliphatic hydrocarbons such as hexane, heptane, octane and the like; aromatic hydrocarbons such as benzene, toluene, xylene and the like; solvents of the alcohol-, ether-, ester- or ketone-type such as isopropyl alcohol, n-butyl alcohol, isobutyl alcohol, octyl alcohol, cellosolve, butyl cellosolve, diethylene glycol monobutyl ether, methyl isobutyl ketone, diisobutyl ketone, ethyl acyl ketone, methyl hexyl ketone, ethyl butyl ketone, ethyl acetate, isobutyl acetate, acyl acetate, 2-ethylhexyl acetate, etc. These organic solvents are usable singly or at least two of them can be used in mixture. Preferred examples thereof are a solvent mixture of a predominant amount of aliphatic hydrocarbon and a suitable amount of aromatic hydrocarbon and/or a solvent of the alcohol-, ether-, ester- or ketone-type. The organic solvent useful in the present invention may contain up to about 50% by weight, based on the total solvent, of trichlorotrifluoroethane, metaxylene hexafluoride, tetrachlorohexafluorobutane or like solvent capable of dissolving well a fluorine-containing resin in order to dissolve readily the fluoroolefin polymer when the polymer contains a large amount of fluorine.

Monomers to be polymerized in the organic solvent in the presence of the dispersion stabilizer are not specifically limited insofar as they are unsaturated radically polymerizable monomers. Useful monomers include a wide variety of those known in the art. Typical examples are as follows:

(i) $C_1$-$C_{18}$ alkyl acrylate or methacrylate such as methyl acrylate, ethyl acrylate, propyl acrylate, butyl acrylate, hexyl acrylate, octyl acrylate, lauryl acrylate, methyl methacrylate, ethyl methacrylate, propyl methacrylate, butyl methacrylate, hexyl methacrylate, octyl methacrylate, lauryl methacrylate and the like; glycidyl acrylate or methacrylate; $C_2$-$C_8$ alkenyl acrylate or methacrylate such as allyl acrylate or methacrylate and the like; $C_2$-$C_8$ hydroxyalkyl acrylate or methacrylate such as hydroxyethyl acrylate or methacrylate, hydroxypropyl acrylate or methacrylate and the like; and $C_3$-$C_{18}$ alkenyloxyalkyl acrylate or methacrylate such as allyloxyethyl acrylate or methacrylate and the like;

(ii) vinyl aromatic compounds such as styrene, α-methylstyrene, vinyltoluene, p-chlorostyrene, vinylpyridine and the like;

(iii) α,β-ethylenically unsaturated acids such as acrylic acid, methacrylic acid, itaconic acid and the like;

(iv) others including acrylonitrile, methacrylonitrile, methyl isopropenyl ketone, vinyl acetate, Veoba monomer (trade name, product of Shell Chemical Co., Ltd., U.S.), vinyl propionate, vinyl pivalate, etc.

Of these examples, suitable monomers are the acrylates or methacrylates exemplified above in (i), monomer mixtures containing at least 40% by weight of the monomer described above in (i) and the like.

The polymerization of the monomers is carried out using a radical polymerization initiator. Usable radical polymerization initiators include, for example, azo-type initiators such as 2,2'-azobisisobutyronitrile, 2,2'-azobis(2,4-dimethylvaleronitrile) and the like, and peroxide-type initiators such as benzoyl peroxide, lauryl peroxide, tert-butyl peroctoate and the like. The polymerization initiator is used in an amount of about 0.2 to about 10 parts by weight, preferably about 0.5 to about 5 parts by weight, per 100 parts by weight of the monomers to be polymerized.

A suitable amount of the dispersion stabilizer in F-NAD, although widely variable depending on its kind, is about 5 to about 80% by weight, preferably about 10 to about 60% by weight, based on the combined amount of the monomers to be polymerized and the dispersion stabilizer.

The total concentration of the radically polymerizable monomer and the dispersion stabilizer in the organic solvent is in the range of about 30 to about 70% by weight, preferably about 30 to about 60% by weight.

The polymerization can be carried out by conventional methods. The temperature for polymerization reaction is about 60° to about 160° C. The reacting can be completed usually in about 1 to about 15 hours.

F-NAD prepared by the above-mentioned process is excellent in the stability of the dispersion.

According to the present invention, a curing agent for cross-linking and curing the dispersion stabilizer and the dispersed particles are added to F-NAD to obtain a clear top coating. F-NAD can be used singly or in mixture with two or more kinds of F-NAD different in composition of polymer or in molecular weight. When required, F-NAD may contain other kind of resin for topcoating such as alkyd resin, acrylic resin or the like in an amount of 50 parts by weight or less per 100 parts by weight of the F-NAD calculated as solids.

Examples of useful curing agent include usual cross-linking agents such as methylolated and/or alkyletherified melamine resins, polyisocyanate compounds, blocked polyisocyanate compounds, etc. The amount of the curing agent used may be suitably selected from the range of about 5 to about 50% by weight based on the combined amount of the dispersion stabilizer, dispersed particles and curing agent.

F-NAD can be admixed, when required, with additives such as a coloring agent, plasticizer and the like. Examples of useful coloring agents are dyes, organic pigments, inorganic pigments, etc. Useful plasticizers include those known in the art such as dimethyl phthalate, dioctyl phthalate and like low-molecular-weight plasticizers, vinyl polymer plasticizers, polyester plasticizers and like high-molecular-weight plasticizers, etc. These plasticizers can be used as contained in F-NAD or as distributed in the polymer particles of F-NAD prepared by dissolving the plasticizers in the radically polymerizable monomer in preparation of F-NAD.

According to the present invention, the base coating and/or the clear top coating may contain an ultraviolet absorber and a light stabilizer. The surface layer in the top coat of the present invention is significantly high in weatherability because of predominant content of fluoroolefin polymer in the surface layer. However, the ultraviolet light in the sunlight rays penetrates through the transparent top coat and tends to deteriorate the base coat. Consequently the inclusion of an ultraviolet absorber and a light stabilizer in the base coating and/or clear top coating enhances the weatherability of the base coat as well as the clear top coat. In other words, the presence of the agents can greatly aid in accomplishing the object of improving the weatherability of finish coat by incorporating the fluorine-containing polymer into the clear top coating. A wide variety of conventional ultraviolet absorbers can be used insofar as the absorber can absorb ultraviolet energy, is compatible with or uniformly dispersible in the resin of the base coating or in the fluoroolefin polymer of the clear top coating and is unlikely to become inactive by easily decomposing at a baking temperature. Preferred examples of such ultraviolet absorbers are benzophenone-, triazole-, phenylsalicylate-, diphenyl acrylate-, acetophenone-type and like absorbers. When a light stabilizer is used conjointly with the ultraviolet absorber, the weatherability of the base coat and top coat can be further improved. An extensive range of conventional light stabilizers are usable in the present invention insofar as they are compatible with or uniformly dispersible in the resin of the base coating or in the fluoroolefin polymer of the clear top coating and are not prone to inactivation by easily decomposing at a temperature for baking the coatings. Examples of such light stabilizers are bis (2,2,6,6-tetramethyl-4-piperidyl)sebacate, bis(1,2,2,6,6-pentamethyl-4-pyperidyl)sebacate, 2-(3,5-di-tert-butyl-4-hydroxybenzyl)-2-n-butylmalonic acid bis(1,2,2,6,-pentamethyl-4-piperidyl)ester, tetrakis(2,2,6,6-tetramethyl- 4-piperidyl)-1,2,3,4-butanetetracarboxylate, tetrakis(1,2,2,6,6-pentamethyl-4-piperidyl)-1,2,3,4-butanetetracarboxylate, etc. These light stabilizers can be used singly or at least two of them are usable in mixture.

A suitable amount of the ultraviolet absorber is about 0.1 to about 10% by weight, preferably about 1 to about 5% by weight, based on the resin solids in the base coating or the clear top coating. A suitable amount of the light stabilizer is about 0.1 to about 10%, preferably about 1 to about 5% by weight, based on the resin solids in the base coating or the clear top coating.

<Coating method>

The finish coating of the present invention can be done by applying the base coating and the clear top coating of the present invention sequentially to form a base coat and a top coat, respectively.

For example, in a 2-coat 1-bake method, the base coating is adjusted to a viscosity of about 10 to about 30 seconds (Ford cup #4, 20° C.) and applied to a substrate to form a base coat having a thickness of about 10 to about 30 μm when cured. Then the coated substrate is left to stand for about 2 to about 10 minutes at room temperature or at a temperature of 100° C. or lower. Thereafter the clear top coating predominantly containing F-NAD and having a viscosity adjusted to about 20 to about 40 seconds (Ford cup #4, 20° C.) is applied to the coated surface, without curing the base coat, by spraying, electrophoretic coating or like coating method to form a top coat having a thickness of about 20 to about 50 μm when cured. Thereafter the coated substrate was left to stand at room temperature for about 2 to about 10 minutes and then heated to about 80 to about 160° C. for about 10 to about 30 minutes to cure the base coat and the top coat at the same time, whereby a finish coat is formed.

According to the present invention, the contemplated finish coat, of course, can be produced also by a 2-coat 2-bake method in which the base coating is applied to a substrate and the base coat is cured at an elevated temperature, or alternatively at room temperature when a resin composition curable at room temperature is used as the base coating, and then the clear top coating is applied, followed by curing the top coat, whereby a finish coat is formed.

Examples of substrates to be coated are a wide variety of articles made of, e.g. steel, aluminum, plastics or the like. The base coating can be applied directly to an article to be coated or applied to the primed surface of the article or to the intercoat over the primed article. Useful primers include, for example, anionic or cationic coating compositions commonly used for electrodeposition.

The coating method of the present invention is capable of forming a finish coat having a good finish appearance and excellent weatherability which coat is unlikely to have impaired gloss and is substantially free of cracks, discoloration, decoloration, blisters and like flaws even in a long-term outdoor exposure.

The present invention will be described below in greater detail with reference to the following preparation examples illustrative of coatings to be used in the present invention, examples illustrative of the present invention and comparison examples in which the parts and percentages are all by weight unless otherwise specified.

PREPARATION EXAMPLES

1. Preparation of metallic base coatings
(M-1):
Styrene (15 parts), 15 parts of methyl methacrylate, 40 parts of butyl methacrylate, 13 parts of 2-ethylhexyl acrylate, 15 parts of hydroxyethyl methacrylate and 2 parts of acrylic acid were copolymerized in xylol using azobisisobutyronitrile as a polymerization initiator, giving a solution of acrylic resin having a nonvolatile content of 50%, a varnish acid value of 8.0 and a viscosity of Y (Gardner, 25° C.).

An organic solvent solution-type base coating (M-1) was prepared from the 50% acrylic resin solution thus obtained and the following other components in amounts shown below.

50% Acrylic resin solution: 160 parts
60% Amino resin (*1): 33 parts
Aluminum Paste A (*2): 12 parts
Organic yellow pigment (*3): 0.01 part
Carbon black (*4): 0.005 part
10% Ultraviolet absorber solution-A (*5): 10 parts
20% Light stabilizer solution-A (*6): 5 parts
Note:
(*1) Trade name "UVAN 20 SE," n-butanol modified melamine resin, product of Mitsui Toatsu Chemicals, Inc., Japan
(*2) Trade name "Aluminum Paste No. 55-519," product of Toyo Aluminum Kabushiki Kaisha, Japan
(*3) Trade name "Irgazin Yellow 3RCTN," product of Ciba-Geigy, Ltd., Switzerland
(*4) Trade name "Black Pearls 1300," carbon black pigment, product of Cabot Corporation, U.S.A.
(*5) 10% Solution of "Tinuvin 900" (trade name, product of Ciba-Geigy, Ltd., Switzerland) in xylol
(*6) 20% Solution of "SANOL LS 292" (trade name, hindered amine-based light stabilizer, product of Sankyo Company, Limited, Japan) in xylol The base coating thus prepared was adjusted to a viscosity of 14 seconds (Ford cup #4, 20° C.) with a solvent mixture consisting of 40% of toluol, 30% of Swazol #1000 (product of COSMO Oil Company, Limited, Japan) and 30% of butyl acetate.

(M-2):
Methyl methacrylate (40 parts), 5 parts of butyl methacrylate, 40 parts of ethyl acrylate, 13 parts of hydroxyethyl methacrylate and 2 parts of acrylic acid were copolymerized in xylol using azobisisobutyronitrile as a polymerization initiator, giving a solution of acrylic resin having a nonvolatile content of 50%, a varnish acid value of 8.0 and a viscosity of Y (Gardner, 25° C.).

An organic solvent solution-type base coating (M-2) was prepared from the 50% acrylic resin solution thus obtained and the following other components in amounts shown below.

50% Acrylic resin solution: 160 parts
60% Amino resin (*1): 33 parts
Aluminum Paste A (*2): 12 parts
Organic yellow pigment (*3): 0.01 part
Carbon black (*4): 0.005 part
10% Ultraviolet absorber solution-A (*5): 10 parts
20% Light stabilizer solution-A (*6): 5 parts M-3):
Using as a dispersion stabilizer 210 parts of a graft polymer prepared from a poly-12-hydroxystearic acid and methacrylic acid copolymer, 100 parts of vinyl monomers (a mixture of 30 parts of styrene, 30 parts of methyl methacrylate, 23 parts of 2-ethylhexyl acrylate, 15 parts of hydroxyethyl acrylate and 2 parts of acrylic acid) were subjected to dispersion polymerization in n-heptane in usual manner, giving a nonaqueous dispersion having a nonvolatile content of 50%.

A nonaqueous dispersion-type base coating (M-3) having the following composition and containing a ultraviolet absorber was prepared.
  50% Nonaqueous dispersion: 160 parts
  60% Amino resin (*1): 33.3 parts
  Aluminum Paste A (*2): 12 parts
  Organic yellow pigment (*3): 0.01 part
  Carbon black (*4): 0.005 part
  10% Ultraviolet absorber solution-B (*7): 10 parts
Note:
(*7) Solution of 10 parts of 2,2',4,4'-tetrahydroxybenzophenone in 90 parts of methyl ethyl ketone The base coating thus obtained was adjusted to a viscosity of 14 seconds (Ford cup #4, 20° C.) with a solvent mixture of 30 parts of an aliphatic hydrocarbon solvent (product of COSMO Oil Co., Ltd., trade name "Swasol #1500"), 60 parts of cellosolve acetate and 10 parts of carbitol acetate.

(M-4):
Using as a dispersion stabilizer 210 parts of a graft polymer prepared from a poly-12-hydroxystearic acid and a methacrylic acid copolymer, 100 parts of vinyl monomers (a mixture of 15 parts of styrene, 20 parts of n-butyl acrylate, 40 parts of methyl methacrylate, 23 parts of hydroxyethyl acrylate and 2 parts of acrylic acid) were subjected to dispersion polymerization in n-heptane in usual manner, giving a nonaqueous dispersion having a nonvolatile content of 50%.

A nonaqueous dispersion-type base coating (M-4) having the following composition and containing a ultraviolet absorber was prepared.
  50% Nonaqueous dispersion: 160 parts
  60% Amino resin (*1): 33.3 parts
  Aluminum Paste A (*2): 12 parts
  Organic yellow pigment (*3): 0.01 part
  Carbon black (*4): 0.005 part
  10% Ultraviolet absorber solution-B (*7): 10 parts
(M-5):
  Styrene: 20 parts
  Methyl methacrylate: 10 parts
  Butyl methacrylate: 25 parts
  2-Ethylhexyl acrylate: 30 parts
  2-Hydroxyethyl acrylate: 10 parts
  Acrylic acid: 5 parts The monomers having the above composition were subjected to solution polymerization using an ethylene glycol monoethyl ether, producing an acrylic resin having a nonvolatile content of 70% and a molecular weight of about 14,000. The acrylic resin thus obtained was neutralized with an equivalent amount of dimethylethanolamine and was thereby rendered water-soluble. Deionized water was added to the resin to give an aqueous solution of acrylic resin (A-1) having a nonvolatile content of 55%.

A metallic base coating (M-5) having the following composition was prepared using the aqueous solution of acrylic resin (A-1).
  Acrylic resin solution (A-1): 75.20 parts
  Amino resin (*8): 10.28 parts
  Aluminum Paste B (*9): 12.23 parts
  Catalyst for curing (*10): 1.00 part
Note:
(*8) Trade name "CYMEL 303," product of Mitsui Toatsu Chemicals, Inc., Japan
(*9) Trade name "Aluminum Paste 1570N," product of Toyo Aluminum Kabushiki Kaisha, Japan
(*10) Paratoluenesulfonic acid The metallic base coating (M-5) was diluted with deionized water to a viscosity of 14 seconds (Ford cup #4, 20° C.).

(M-6):
  Styrene: 5 parts
  Methyl methacrylate: 25 parts
  Butyl methacrylate: 25 parts
  2-Ethylhexyl acrylate: 25 parts
  2-Hydroxyethyl acrylate: 17 parts
  Methacrylic acid: 3 parts An emulsion containing a resin with a molecular weight of about 50,000 and a particle size of 0.1 to 0.3 $\mu$m and having a nonvolatile content of 45% was prepared from the monomers having the above composition by a usual emulsion polymerization method. The emulsion was adjusted to a pH of 8 with dimethyl ethanol amine for stabilization, giving an acrylic resin emulsion (AE-1).

Using this acrylic resin emulsion (AE-1), an aqueous dispersion-type metallic base coating (M-6) having the following composition was prepared.
  Acrylic resin emulsion (AE-1): 177.8 parts
  Amino resin (*8): 20.4 parts
  Aluminum Paste B (*9): 18.5 parts
  Catalyst for curing (*10): 2.0 parts The metallic base coating (M-6) was diluted with deionized water to a viscosity of 14 seconds (Ford cup #4, 20° C.).

(M-7):
  Acrylic resin (A-1): 72.7 parts
  Acrylic resin emulsion (AE-1): 88.9 parts
  Amino resin (*8): 20.4 parts
  Aluminum Paste B (*9): 18.5 parts
  Catalyst for curing (*10): 2.0 parts A metallic base coating (M-7) was prepared from a mixture of the above composition.

The metallic base coating (M-7) thus obtained was diluted with deionized water to a viscosity of 14 seconds (Ford cup #4, 20° C.).

2. Preparation of solid color coating compositions
(S-1):
  50% Alkyd resin solution (*11): 140 parts
  60% Amino resin (*1): 50 part
  Titanium oxide (*12): 100 parts
  Xylol/butanol (1/1): 17 parts The composition comprising the above components was adjusted with Swazol #1000 to a viscosity of 25 seconds (Ford cup #4, 20° C.). Pigment volume concentration (PVC) was 19.5% by volume.
Note:
(*11) 50% alkyd resin solution prepared from 1 mole of phthalic anhydride, 1 mole of trimethylolpropane and 0.5 mole of fatty acid of coconut oil, and having a hydroxyl number of 85, an oil length of 31% and an acid number of 7.3.
(*12) TITONE R-650 (trademark, product of Sakai Chemical Industry, Co., Ltd., Japan)
(S-2):
  50% Acrylic resin solution (*16): 140 parts
  60% Amino resin (*1): 50 parts
  Titanium oxide (*12): 4.2 parts
  Carbon black (*13): 1.6 parts
  Oxide yellow (*14): 3.0 parts
  Organic red pigment (*15): 0.5 part
  Cyanine Blue (*17): 6.2 parts Note:
(*13) Product of Mitsubishi Chemical Industries Limited, Japan, Carbon black MA-100B
(*14) Product of Titan Kogyo Kabushiki Kaisha, Japan, Mapiko Yellow XLO
(*15) Product of Dainichiseika Colour & Chemicals, Mfg., Co., Ltd., Japan, Corofine Red 6820
(*16) 50% Acrylic resin solution prepared from 15 parts of styrene, 42 parts of n-butyl acrylate, 23 parts of 2-ethylhexyl methacrylate, 18 parts of hydroxy methacrylate and 2 parts of acrylic acid
(*17) Product of Dainichiseika Colour & Chemicals, Mfg., Co., Ltd., Japan, Phthalocyanine Blue 5240K.

3. Preparation of clear top coatings (T-1):
Synthesis of polymer dispersion (A)
Heptane: 102 parts
n-Butyl acetate: 8 parts
Dispersion stabilizer (*18): 108 parts
Note:
(*18) "LUMIFLON LF 4006" with a weight-average molecular weight of about 19,000 and 30% fluorine content, product of Asahi Glass Company Limited, Japan The above components were placed into a flask and refluxed with heating. The following monomers and polymerization initiator were added dropwise thereto over a period of 3 hours and subjected to aging for 2 hours, followed by addition of 26 parts of n-butyl acetate.
Styrene: 15 parts
Methyl methacrylate: 40 parts
Acrylonitrile: 30 parts
2-Hydroxyethyl methacrylate: 15 parts
Tert-butyl-peroxy-2-ethyl hexanoate: 1.5 parts The dispersion thus obtained was found to be an opaque white stable low-viscosity polymer dispersion having 47% nonvolatile content and a viscosity of A (Gardner, 25° C.) and containing polymer particles of 0.15 μm particle size (as measured under an electron microscope, the same hereinafter). The dispersion was left to stand at room temperature for 6 months with the result that no precipitate or coarse particle was found.

(T-2):
Synthesis of polymer dispersion (B)
Heptane: 102 parts
n-Butyl acetate: 8 parts
Dispersion stabilizer (*18): 108 parts The above components were placed into a flask and refluxed with heating. The following monomers and polymerization initiator were added dropwise thereto over a period of 3 hours and subjected to aging for 2 hours, followed by addition of 26 parts of n-butyl acetate.
Styrene: 15 parts
Methyl methacrylate: 17 parts
Acrylonitrile: 30 parts
2-Hydroxyethyl methacrylate: 15 parts
Glycidyl methacrylate: 20 parts
Methacrylic acid: 3 parts
Tert-butylperoxy-2-ethyl hexanoate: 1.5 parts The dispersion thus obtained was found to be an opaque white stable low-viscosity polymer dispersion having 46% nonvolatile content and a viscosity of B (Gardner, 25° C.) and containing polymer particles of 0.12 μm particle size. The dispersion was left to stand at room temperature for 6 months with the result that no precipitate or coarse particle was found.

(T-3):
Introduction of double bond into dispersion stabilizer
To 200 parts of "LUMIFLON LF 400" (50% nonvolatile content, acid number of 5, weight-average molecular weight of about 50,000, 27% fluorine content, hydroxyl number of about 50, product of Asahi Glass Company, Limited, Japan) were added the following substances:
Glycidyl methacrylate: 0.8 part
4-Tert-butylpyrocatechol: 0.02 part
Dimethylamino ethanol: 0.1 part The mixture was refluxed for 5 hours to introduce copolymerizable double bond into the molecular chain of dispersion stabilizer.

The reduction in acid number of the resin was subdued to less than 0.02 to introduce up to about one double bond per molecular chain of the dispersion stabilizer.

Synthesis of a polymer dispersion (C)
Heptane: 80 parts
n-Butyl acetate: 8 parts
Dispersion stabilizer obtained above: 130 parts The above substances were placed into a flask and refluxed with heating. The following monomers and polymerization initiator were added dropwise thereto over a period of 3 hours and subjected to aging for 2 hours, followed by addition of 26 parts of n-butyl acetate.
Styrene: 15 parts
Methyl methacrylate: 40 parts
Acrylonitrile: 30 parts
2-Hydroxyethyl methacrylate: 15 parts
Tert-butylperoxy-2-ethyl hexanoate: 1.5 parts The dispersion thus obtained was found to be an opaque white stable low-viscosity polymer dispersion having 47% nonvolatile content and a viscosity of D (Gardner, 25° C.) and containing polymer particles of 0.18 μm particle size. The dispersion was left to stand at room temperature for 12 months with the result that no precipitate or coarse particle was found.

(T-4):
Styrene (15 parts), 42 parts of n-butyl methacrylate, 23 parts of 2-ethylhexyl methacrylate, 18 parts of hydroxyethyl methacrylate and 2 parts of acrylic acid were copolymerized in xylol using azobisisobutyronitrile as a polymerization initiator, giving an acrylic resin solution having a nonvolatile content of 50%, a varnish acid number of 9.0, a viscosity of H (Gardner, 25° C.) and a weight average molecular weight of about 16,000.

(T-5):
(1) Preparation of dispersion stabilizer
Isobutyl acetate (40 parts) and 40 parts of toluene were refluxed with heating, and the following monomers and polymerization initiator were added dropwise over a period of 3 hours. The mixture was subjected to aging for 2 hours after the dropwise addition.
Styrene: 10 parts
Isobutyl methacrylate: 69 parts
2-Ethylhexyl methacrylate: 10 parts
2-Hydroxyethyl methacrylate: 10 parts
Methacrylic acid: 1 part
2,2'-Azobisisobutyronitrile: 2 parts The acrylic resin varnish thus obtained was found to have a nonvolatile content of 55%, a viscosity of H (Gardner, 25° C.) and a weight average molecular weight of about 16,000.

(2) Preparation of nonaqueous dispersion

TABLE 2-continued

| | | | | | | | | |
|---|---|---|---|---|---|---|---|---|
| Appearance[1] | A | A | A | A | A | A | A | A |
| Distinctness-of-image gloss[1] | 0.6 | 0.6 | 0.6 | 0.6 | 0.6 | 0.6 | 0.6 | 0.6 |
| Adhesion[1] | A | A | A | A | A | A | A | A |
| Hardness | F | F | F | F | HB | HB | HB | HB |
| Impact resistance | 20 | 20 | 20 | 20 | 30 | 30 | 30 | 30 |
| Gasoline resistance | A | A | A | A | A | A | A | A |
| Alkali resistance | A | A | A | A | A | A | A | A |

| | Comparison Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Gloss[1] | | | | | | | | | | | | |
| 60° before AW test[2] | 100 | 100 | 99 | 100 | 94 | 96 | 100 | 100 | 99 | 100 | 94 | 96 |
| after AW test | 72 | 70 | 74 | 70 | 85 | 86 | 72 | 70 | 73 | 70 | 85 | 85 |
| 20° before AW test | 90 | 91 | 90 | 91 | 80 | 81 | 90 | 91 | 90 | 91 | 80 | 80 |
| after AW test | 15 | 20 | 24 | 23 | 59 | 59 | 14 | 20 | 25 | 24 | 59 | 59 |
| Surface tension[1] before AW test | 40 | 41 | 40 | 40 | 38 | 38 | 40 | 41 | 40 | 40 | 38 | 38 |
| after AW test | * | * | * | * | 46 | 45 | * | * | * | * | 46 | 45 |
| Appearance[1] | D | D | D | D | B | B | D | D | D | D | B | B |
| Distinctness-of-image gloss[1] | 0.1 | 0.1 | 0.1 | 0.1 | 0.6 | 0.6 | 0.1 | 0.1 | 0.1 | 0.1 | 0.6 | 0.6 |
| Adhesion[1] | C | C | C | C | A | A | C | C | C | C | B | B |
| Hardness | H | HB | F | HB | F | F | H | HB | F | HB | F | F |
| Impact resistance | 20 | 30 | 25 | 30 | 20 | 30 | 20 | 30 | 25 | 30 | 20 | 30 |
| Gasoline resistance | A | A | A | A | A | A | A | A | A | A | A | A |
| Alkali resistance | A | A | A | A | A | A | A | A | A | A | A | A |

Note:
*The surface tension was not measurable because cracking occurred in great number.
[1] The gloss, surface tension, appearance, distinctness-of-image gloss and adhesion were determined or evaluated after accelerated weathering test was conducted.
[2] AW test = accelerated weathering test.

We claim:

1. A finish coating method for forming a finish coat, comprising the steps of applying to a substrate a base coating composition containing a pigment and applying a clear top coating composition to the coated surface, the method being characterized in that:
   (1) the clear top coating composition is a curable coating comprising predominantly a nonaqueous dispersion of a polymer of a radically polymerizable monomer, the dispersion being prepared by polymerization of the radically polymerizable monomer in an organic solvent in which the monomer is soluble and in which the polymer produced from the monomer is insoluble and in the presence of a fluoroolefin polymer as a dispersion stabilizer which is soluble in the organic solvent and which has a weight-average molecular weight of about 5,000 to about 120,000 and a fluorine content of about 1 to about 60% by weight, and
   (2) the top coat formed from the top coating composition is comprised of a continuous phase composed of the fluoroolefin polymer and polymer particles produced from the radically polymerizable monomer and dispersed in the top coat.

2. A finish coating method according to claim 1 wherein the pigment-containing base coating composition is applied to a substrate, then a clear top coating composition is applied to the coated surface, and the coated substrate is heated to cure the base coat and the top coat at the same time.

3. A finish coating method according to claim 1 wherein the pigment-containing base coating composition is a metallic coating composition.

4. A finish coating method according to claim 1 wherein the pigment-containing base coating composition is a solid color coating composition.

5. A finish coating method according to claim 3 wherein the pigment-containing base coating composition is an organic solvent-type or nonaqueous dispersion-type metallic coating composition.

6. A finish coating method according to claim 3 wherein the pigment-containing base coating composition is an aqueous metallic coating composition.

7. A finish coating method according to claim 1 wherein the fluoroolefin polymer contains as a constituent fluoroolefin having 1 to 6 fluorine atoms and 2 to 3 carbon atoms.

8. A finish coating method according to claim 7 wherein the fluoroolefin polymer contains as a constituent at least one fluoroolefin selected from the group consisting of tetrafluoroethylene, chlorotrifluoroethylene, vinyl fluoride, and vinylidene fluoride.

9. A finish coating method according to claim 7 wherein the fluoroolefin polymer contains as the copolymerizing component at least one unsaturated monomer selected from the group consisting of vinyl ether compounds and olefin compounds.

10. A finish coating method according to claim 9 wherein the copolymerizing component is at least one unsaturated monomer selected from the group consisting of alkyl vinyl ether, alicyclic vinyl ether, hydroxy vinyl ether, glycidyl group-containing vinyl ether, olefin and haloolefin.

11. A finish coating method according to claim 1 wherein the fluoroolefin polymer has a fluorine content of 10 to 40% by weight.

12. A finish coating method according to claim 1 wherein the fluoroolefin polymer has 0.1 to 2 moles of polymerizable double bonds on the average per mole of the polymer.

* * * * *